(12) United States Patent
Bakhsh et al.

(10) Patent No.: US 7,000,945 B2
(45) Date of Patent: Feb. 21, 2006

(54) INFLATABLE WINDSHIELD CURTAIN

(75) Inventors: Ali Emam Bakhsh, Rochester Hills, MI (US); Al A. Saberan, New Baltimore, MI (US); Ayad G. Nayef, Sterling Heights, MI (US)

(73) Assignee: TRW Vehicle Safety Systems Inc., Washington, MI (US)

( * ) Notice: Subject to any disclaimer, the term of this patent is extended or adjusted under 35 U.S.C. 154(b) by 296 days.

(21) Appl. No.: 10/659,599

(22) Filed: Sep. 10, 2003

(65) Prior Publication Data

US 2005/0052003 A1 Mar. 10, 2005

(51) Int. Cl.
*B60R 21/20* (2006.01)
(52) U.S. Cl. .................................. 280/730.1; 280/728.2
(58) Field of Classification Search ............. 280/728.2, 280/730.1, 730.2; 296/214, 210
See application file for complete search history.

(56) References Cited

U.S. PATENT DOCUMENTS

| 5,562,302 | A | | 10/1996 | Turnbull |
| 5,602,734 | A | | 2/1997 | Kithil |
| 5,988,735 | A | * | 11/1999 | Muller ........................ 296/214 |
| 6,179,326 | B1 | | 1/2001 | Breed et al. |
| 6,224,088 | B1 | | 5/2001 | Lohavanijaya |
| 6,431,586 | B1 | | 8/2002 | Eyrainer et al. |
| 6,460,878 | B1 | | 10/2002 | Eckert et al. |
| 6,523,887 | B1 | * | 2/2003 | Picken et al. ................ 296/214 |
| 6,588,793 | B1 | * | 7/2003 | Rose ........................ 280/728.2 |
| 6,913,280 | B1 | * | 7/2005 | Dominissini et al. ..... 280/728.2 |
| 6,921,121 | B1 | * | 7/2005 | Schneider et al. ......... 296/97.1 |
| 2003/0052476 | A1 | | 3/2003 | Rose |

* cited by examiner

*Primary Examiner*—David R. Dunn
(74) *Attorney, Agent, or Firm*—Tarolli, Sundheim, Covell & Tummino L.L.P.

(57) ABSTRACT

An apparatus (10) helps to protect an occupant of a vehicle (12) that has a windshield (70) and a roof (40) including a front header (54). The apparatus (10) includes an inflatable windshield curtain (80) inflatable away from the roof (40) to a position between the windshield (70) and a vehicle occupant. The windshield curtain (80) has a stored condition in which the windshield curtain is positioned in a recess (90) that extends into a forward facing surface (92) of the front header (54).

21 Claims, 5 Drawing Sheets

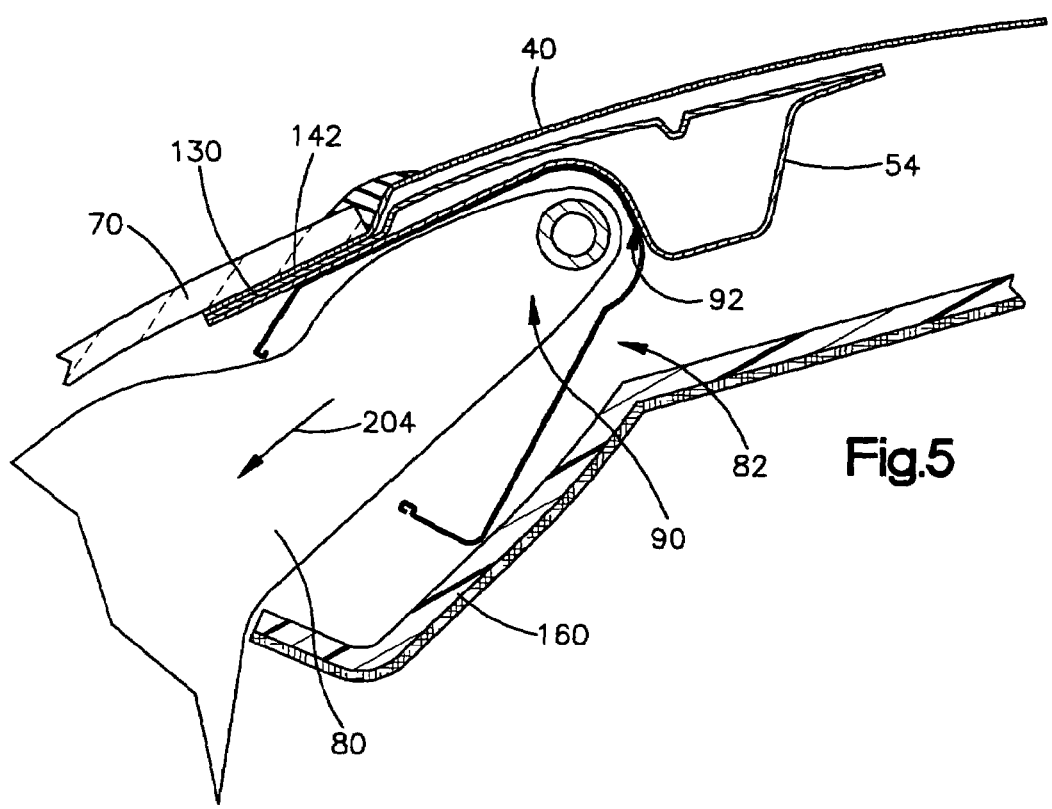
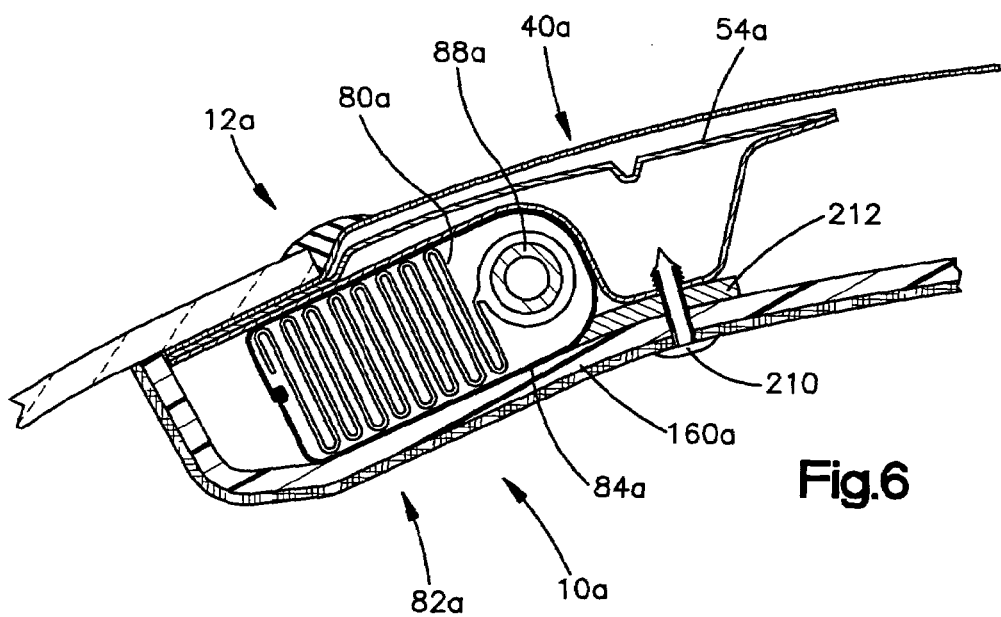

INFLATABLE WINDSHIELD CURTAIN

FIELD OF THE INVENTION

The present invention relates to an apparatus including an inflatable vehicle occupant protection device for helping to protect an occupant of a vehicle upon the occurrence of an event for which occupant protection is desired, such as a vehicle collision and/or a vehicle rollover.

BACKGROUND OF THE INVENTION

It is known to inflate an inflatable vehicle occupant protection device to help protect a vehicle occupant upon the occurrence of an event such as a vehicle collision or rollover. One particular type of inflatable vehicle occupant protection device is an inflatable driver or passenger air bag that is inflatable between an occupant and an instrument panel and/or steering wheel of the vehicle. Another type of inflatable vehicle occupant protection device is an inflatable side curtain that inflates away from the vehicle roof to a position between the vehicle occupant and a side structure of the vehicle. Other known types of inflatable vehicle occupant protection devices include seat-mounted side impact air bags, inflatable knee bolsters, and inflatable seat belts. The known inflatable vehicle occupant protection devices are inflated from a deflated condition by inflation fluid provided by an inflator.

SUMMARY OF THE INVENTION

The present invention relates to an apparatus for helping to protect an occupant of a vehicle that has a windshield and a roof including a front header. The apparatus includes an inflatable windshield curtain inflatable away from the roof to a position between the windshield and a vehicle occupant. The windshield curtain has a stored condition in which the windshield curtain is positioned in a recess that extends into a forward facing surface of the front header.

The present invention also relates to an apparatus for helping to protect an occupant of a vehicle that has a windshield and a roof including a front header. The apparatus includes a headliner underlying the vehicle roof and a module connected with the headliner and positioned between the headliner and the vehicle roof. The module includes a windshield supported on the headliner and positioned in a recess formed along a forward facing portion of the front header. The windshield curtain is inflatable away from the roof to a position between the windshield and a vehicle occupant.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIG. 5 is a sectional view of the apparatus of FIG. 4 in an inflated and deployed condition; and FIGS. 6 and 7 are sectional views of an apparatus for helping to protect a vehicle occupant, according to a second embodiment of the present invention.

DESCRIPTION OF THE EMBODIMENTS

In this description of embodiments of the present invention, when reference is made to a longitudinal direction in or along the vehicle 12, it is meant to describe the direction measured generally along a longitudinal axis 24 (FIG. 2) of the vehicle. This longitudinal direction is indicated generally by the arrow labeled 26 in FIG. 1. The longitudinal direction may also be described as the direction measured generally along the length of the vehicle, in the direction of straight forward vehicle travel, or horizontally as viewed in FIG. 1. Also, in this description of the present invention, when reference is made to a lateral direction in or across the vehicle 12, it is meant to describe a direction measured generally perpendicular to the axis 24. This lateral direction is indicated generally by the arrow labeled 28 in FIG. 2. The lateral direction may also be described as the direction measured generally along the width of the vehicle, perpendicular to the direction of straight forward vehicle travel, or horizontally as viewed in FIG. 2.

Figure 1:
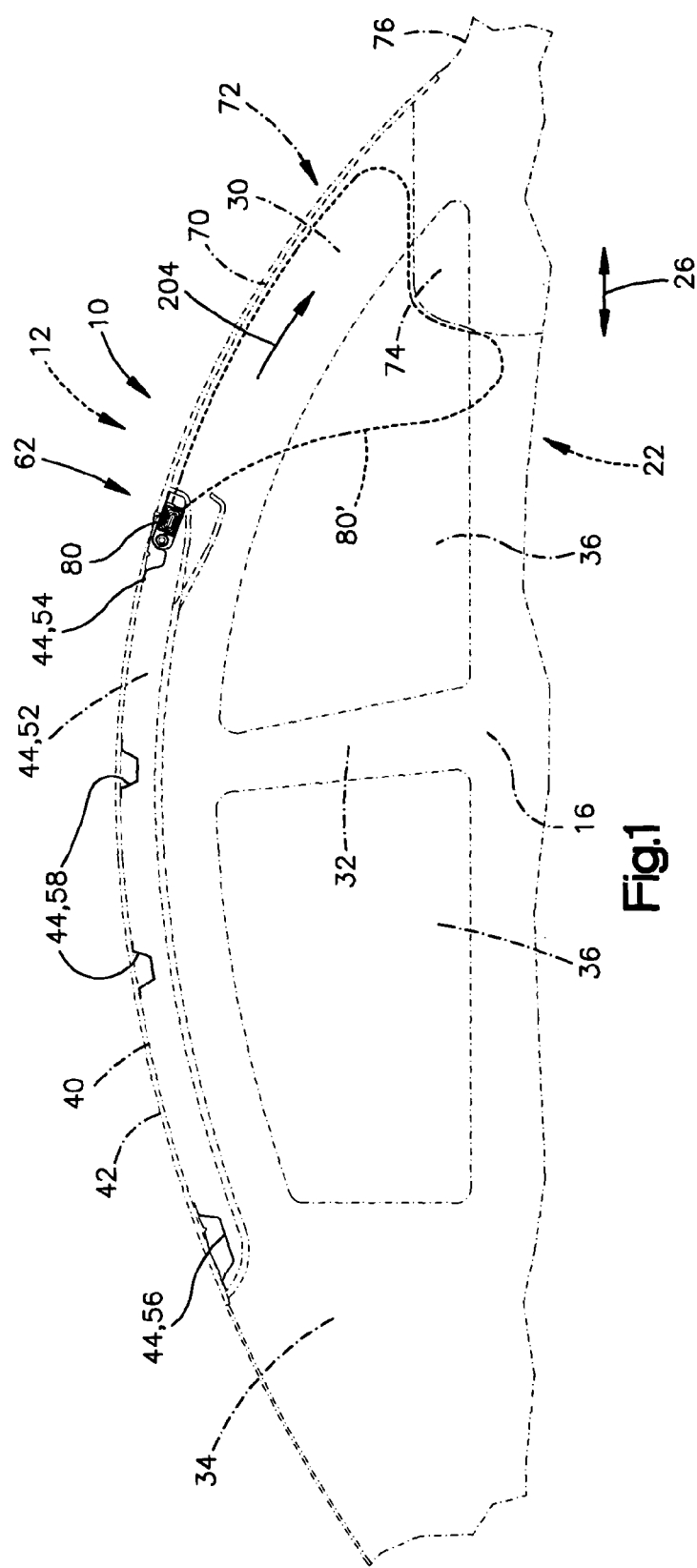
FIG. 1 is a schematic side view of an apparatus for helping to protect a vehicle occupant, according to a first embodiment of the present invention.
Figure 2:
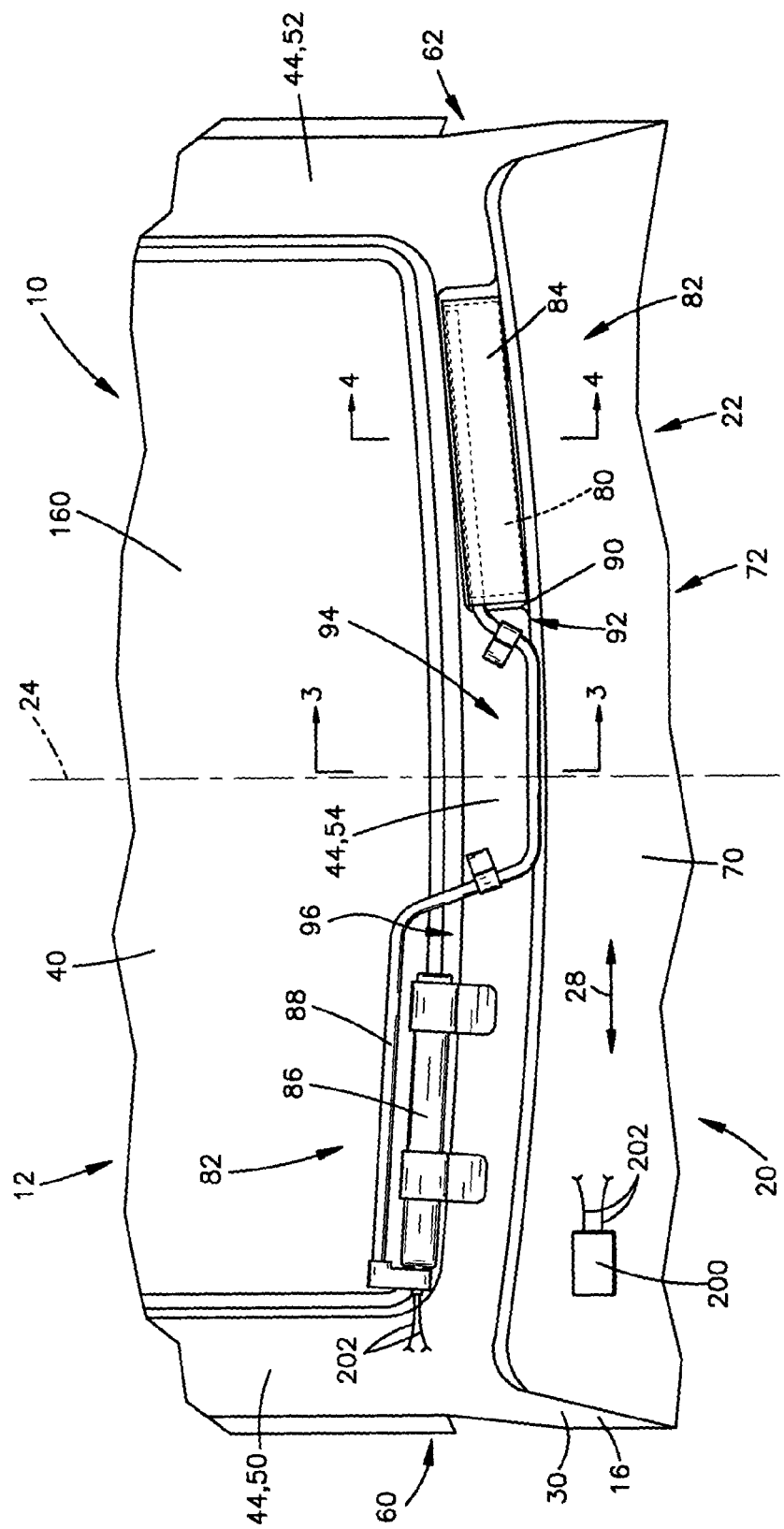
FIG. 2 is a bottom view of the apparatus of FIG. 1.

Referring to FIG. 1, as representative of a first embodiment of the present invention, an apparatus 10 helps to protect an occupant of a vehicle 12. The vehicle 12 includes side structure 16 that extends longitudinally along the length of the vehicle. Referring to FIG. 2, it will be appreciated that the vehicle 12 includes a side structure 16 that extends along a driver side 20 of the vehicle and a side structure that extends along a passenger side 22 of the vehicle 12. Referring to FIGS. 1 and 2, the side structure 16 on both the driver side 20 and the passenger side 22 includes an A pillar 30, a B pillar 32, a C pillar 34, and side windows 36.

The vehicle 12 also includes a roof 40 that extends laterally across the vehicle 12 from the side structure 16 on the driver side 20 to the side structure on the passenger side 22 of the vehicle. The roof 40 also extends longitudinally along the length of the vehicle 12 from the A pillar 30 to the C pillar 34. The roof 40 includes an outer roof panel 42 and structural members 44 for helping to support the outer roof panel and for improving the structural integrity of the roof.

The structural members 44 of the roof 40 may include a driver side rail 50, a passenger side rail 52, a front header 54, a rear header 56, and one or more roof bows 58. The driver side rail 50 extends along the intersection of the side structure 16 and the roof 40 on the driver side 20 of the vehicle 12. The driver side rail 50 may be connected with the A pillar 30, B pillar 32, and C pillar 34 on the driver side 20 of the vehicle 12. The driver side rail 50 may also be connected with the outer roof panel 42 by any suitable means, such as a weld.

The passenger side rail 52 extends along the intersection of the side structure 16 and the roof 40 on the passenger side 22 of the vehicle 12. The passenger side rail 52 may be connected with the A pillar 30, B pillar 32, and C pillar 34 on the passenger side 22 of the vehicle 12. The passenger side rail 52 may also be connected with the outer roof panel 42 by any suitable means, such as a weld.

The front header 54 is the forwardmost laterally extending structural member 44 of the roof 40. Referring to FIG. 2, the front header 54 extends laterally across the vehicle 12 from adjacent or near the A pillar 30 on the driver side 20 to adjacent or near the A pillar on the passenger side 22. The front header 54 may intersect the A pillars 30 on the driver side 20 and/or passenger side 22 of the vehicle 12. The front header 54, driver side rail 50, and A pillar 30 on the driver side 20 converge and are connected with each other at a location identified generally at 60 in FIG. 2. The front header 54, passenger side rail 52, and A pillar 30 on the passenger side 22 converge and are connected with each other at a location identified generally at 62 in FIG. 2. These connections are achieved by suitable means, such as a weld. The roof 40 may also include means (not shown), such as a plate, bracket, or reinforcement panel, for helping to make these connections.

The rear header 56 (FIG. 1) is the rearwardmost laterally extending structural member of the roof 40. The rear header 56 extends laterally across the vehicle 12 from the C pillar 34 on the driver side 20 to the C pillar on the passenger side 22. The rear header 56, driver side rail 50, and C pillar 30 on the driver side 20 converge and are connected with each other. The rear header 56, passenger side rail 52, and C pillar 30 on the passenger side 22 converge and are connected with each other. These connections are achieved by any suitable means (not shown), such as a weld. The roof 40 may also include means (not shown), such as a plate, bracket, or reinforcement panel, for helping to make these connections.

The roof bows 58 are laterally extending structural members of the roof 40 positioned between the front header 54 and rear header 56. The roof bows 58 extend laterally across the vehicle 12 between the driver side rail 50 and the passenger side rail 52. The roof bows 58 may be connected with the driver and passenger side rails 50 and 52 by any suitable means (not shown), such as welding. The roof bows 58 may also be connected with the outer roof panel 42 by suitable means (not shown), such as an adhesive.

The vehicle 12 also includes a windshield 70. As shown in FIG. 2, the windshield 70 extends laterally across the vehicle 12 from the A pillar 30 on the driver side 20 to the A pillar on the passenger side 22. The windshield 70 covers a windshield opening 72 of the vehicle 12. The windshield opening 72 (FIG. 1) is defined at an upper extent by the front header 54 and at a lower extent generally by an instrument panel 74 and/or hood 76 of the vehicle 12. The windshield opening 72 (FIG. 2) is defined at lateral extents by the A pillars 30 on the driver side 20 and passenger side 22 of the vehicle 12.

The apparatus 10 includes an inflatable vehicle occupant protection device in the form of an inflatable windshield curtain 80 that is mounted adjacent the location where the windshield 70 intersects the roof 40. Referring to FIG. 2, the windshield curtain 80 is part of a module 82 mounted to the front header 54 of the roof 40. The module 82 may include a housing 84 that encloses the windshield curtain 80 and helps support the curtain in a stored condition.

Figure 4:
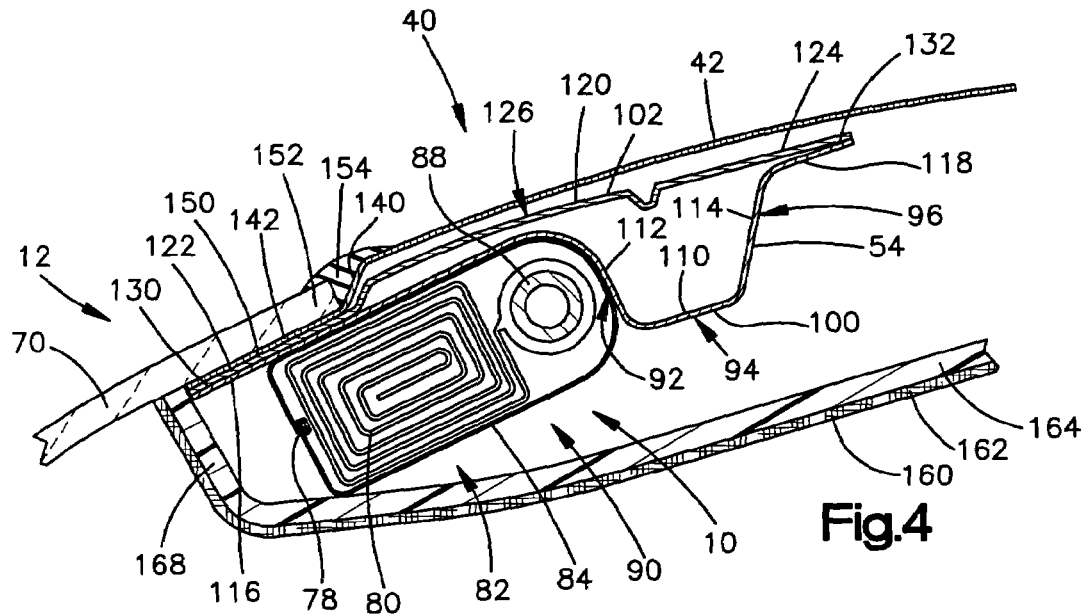
FIG. 4 is a sectional view of the apparatus taken generally along line 4—4 in FIG. 2.

Referring to FIG. 4, the housing 84 is constructed of a suitable material, such as plastic. The housing 84 includes a seam 78 along which the housing may open upon inflation and deployment of the windshield curtain 80. The seam 78 may, for example, comprise interlocking beads that release to open the housing 84 or may comprise a tear seam in which the thickness of the housing is reduced to weaken the housing along the seam.

The module 82 (FIG. 2) may also include an inflation fluid source 86, such as an inflator, for providing inflation fluid for inflating the windshield curtain 80. The module 82 may further include a fill tube 88, connected in fluid communication with the inflator 86 and the windshield curtain 80, for delivering inflation fluid from the inflator to the windshield curtain. The fill tube 88 may have a portion that is positioned in the windshield curtain 80 and that has a plurality of openings (not shown) for providing fluid communication between the fill tube 82 and the curtain. Those skilled in the art, however, will appreciate that the fill tube 82 could be omitted, in which case the inflator 86 may be connected in fluid communication with the windshield curtain 80 directly or via a manifold (not shown).

The inflator 86 contains a stored quantity of pressurized inflation fluid in the form of a gas for inflating the windshield curtain 80. The inflator 86 alternatively could contain a combination of pressurized inflation fluid and ignitable material for heating the inflation fluid, or could be a pyrotechnic inflator that uses the combustion of gas-generating material to generate inflation fluid. As a further alternative, the inflator 86 could be of any suitable type or construction for supplying a medium for inflating the windshield curtain 80.

The apparatus 10 has a stored condition in which the windshield curtain 80 is stored in a deflated condition. This is illustrated in FIGS. 1, 2, and 4. When the apparatus 10 is in the stored condition, the deflated windshield curtain 80 has an elongated configuration and extends laterally across the vehicle 12 along the front header 54 adjacent the windshield 70.

Referring to FIG. 2, in the first embodiment of the invention, the windshield curtain 80 extends along a portion of the front header 54 located between the A pillar 30 on the passenger side 22 of the vehicle 12 and the centerline 24 of the vehicle. In this configuration, the windshield curtain 80 is inflatable between an occupant of the passenger side 22 of the vehicle 12 and the instrument panel 74 and windshield 70 of the vehicle (see FIG. 1).

The windshield curtain 80 could, however, have alternative extents in the vehicle 12. For example, in another passenger side configuration, the windshield curtain 80 may extend laterally across the vehicle 12 from the A pillar 30 on the passenger side 22 to the centerline 24 and overlie the A pillar and/or the centerline. The windshield curtain 80 alternatively could have a driver side configuration. In this configuration, the windshield curtain 80 may extend laterally across the vehicle 12 between the A pillar 30 on the driver side 20 and the centerline 24 and may overlie the A pillar and/or the centerline. As a further alternative, the windshield curtain 80 may cover both the driver side 20 and the passenger side 22 of the vehicle 12. In this instance, the windshield curtain 80 may extend laterally across the vehicle 12 from the A pillar 30 on the driver side 20 to the A pillar on the passenger side 22 and may overlie either or both of the A pillars.

Figure 3:
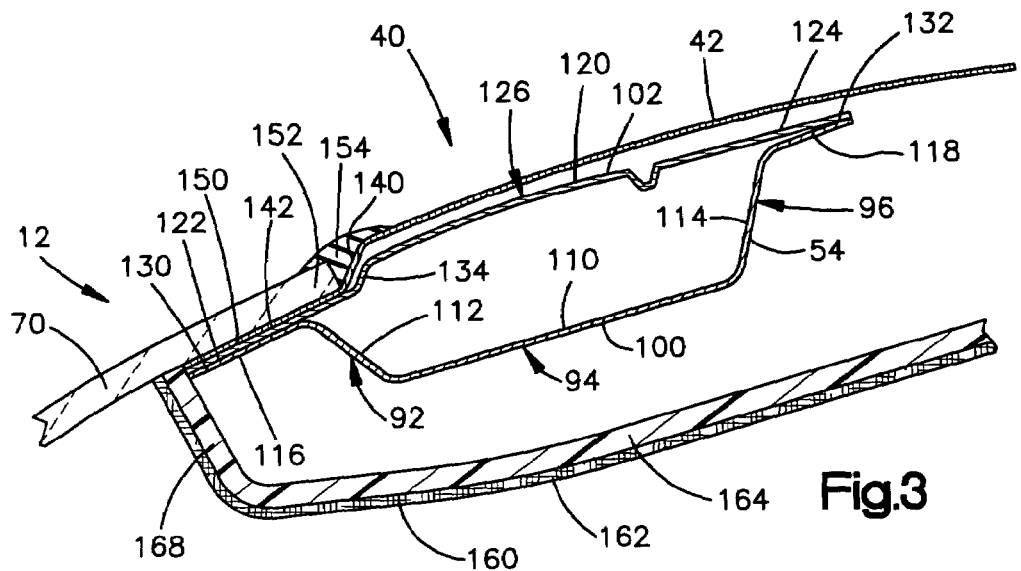
FIG. 3 is a sectional view of the apparatus taken generally along line 3—3 in FIG. 2 with certain parts omitted.

According to the present invention, windshield curtain 80 when in the stored condition is positioned in a recess 90 that extends into a forward facing surface 92 of the front header 54. Referring to FIGS. 3 and 4, the forward facing surface 92 of the front header 54 is presented facing generally forward and downward in the vehicle 12. As shown in FIG. 4, the recess 90 effectively moves the forward facing surface 92 rearward in the vehicle, i.e., to the right as viewed in FIG. 4, in order to make room for receiving the module 82.

Referring to FIG. 2, the recess 90 extends along a portion of the front header 54 that is slightly longer than the portion of the windshield curtain module 82 that includes the windshield curtain 80 and the housing 84. Other portions of the windshield curtain module, i.e., the inflator 86 and the fill tube 88, may be mounted to the front header 54 at locations other than the recess 90. For example, as shown in FIG. 2, the fill tube 88 may have a portion mounted on a lower surface 94 of the front header 54 and the inflator 86 may be mounted adjacent a rear surface 96 of the front header.

Referring to FIGS. 3 and 4, the front header 54 is constructed of sheets of material that are stamped or otherwise formed to a desired configuration, placed in an overlying manner, and connected by any suitable means (not shown), such as welding. As shown in FIGS. 3 and 4, the front header 54 includes a sheet of material that forms a header portion 100 and a sheet of material that forms a reinforcement portion 102. The reinforcement portion 102 overlies the header portion 100.

The sheet of material forming the header portion 100 is stamped or otherwise pressed or formed to provide the configuration illustrated in FIGS. 3 and 4. As shown in FIGS. 3 and 4, the header portion 100 includes a lower central portion 110, a front side portion 112, a rear side portion 114, a front edge portion 116, and a rear edge portion 118. The front side portion 112 and rear side portion 114 extend transverse to and upward from front and rear edge portions, respectively, of the central portion 110. The front edge portion 116 extends transverse to and forward from the front side portion 112. The rear edge portion 118 extends transverse to and rearward from the rear side portion 114.

The central portion 110 helps define the lower surface 94 of the front header 54. The front side portion 112 helps define the forward surface 92 of the front header 54. The rear side portion 114 helps define the rear surface 96 of the front header 54.

The sheet of material forming the reinforcement portion 102 is stamped or otherwise pressed or formed to provide the configuration illustrated in FIGS. 3 and 4. As shown in FIGS. 3 and 4, the reinforcement portion 102 includes a central portion 120, a front edge portion 122, and a rear edge portion 124. The central portion 120 helps define an upper surface 126 of the front header 54.

The front edge portion 116 of the header portion 100 and the front edge portion 122 of the reinforcing portion 102 are positioned in abutting engagement with each other and connected with each other along their lengths by any suitable means (not shown), such as a weld. The front edge portions 116 and 122 when connected in this manner help form a front edge portion 130 of the front header 54.

The rear edge portion 118 of the header portion 100 and the rear edge portion 124 of the reinforcing portion 102 are positioned in abutting engagement with each other and connected with each other along their lengths by any suitable means (not shown), such as a weld. The rear edge portions 118 and 124 when connected in this manner help form a rear edge portion 132 of the front header 54.

The reinforcement portion 102 includes a shoulder portion 134 that is effective to lower the front edge portion 122 relative to the central portion 120. The outer roof panel 42 overlies the front header 54. The outer roof panel 42 includes a shoulder portion 140 and a front edge portion 142 that overlie and follow respective contours of the shoulder portion 134 and front edge portion 130 of the front header 54. The front edge portion 142 of the outer roof panel 42 lies adjacent to and is connected with the front edge portion 130 by suitable means, such as a weld.

The front edge portion 130 of the front header 54 and the front edge portion 142 of the outer roof panel 42 help define a portion 150 for receiving an upper edge portion 152 of the windshield 70. The upper edge portion 152 of the windshield 70 when positioned in the receiving portion 150 overlies the front edge portion 142 of the outer roof panel 42. The upper edge portion 152 is adhered to the receiving portion 150 by means (not shown) such as an adhesive. An elastomeric seal 154 may help fill the space and form a seal between the upper edge portion 152 of the windshield 70 and the outer roof panel 42.

The vehicle 12 also includes a headliner 160 that underlies the vehicle roof 40. In the illustrated embodiments, the headliner 160 includes a lower layer of material 162 that forms a part of the headliner visible from the passenger compartment of the vehicle 12. The headliner 160 also includes an upper layer of material 164 that overlies the lower layer 162. The upper layer 164 may be constructed of a soft cushioning material, such as foam. The lower layer 162 may be constructed of a material, such as fabric, that provides a desired aesthetic presentation.

The headliner 160 may extend from a location underlying or forward of the front header 54 to a location underlying or rearward of the rear header 56 (see FIG. 1). The headliner 160 may also extend from the driver side rail 50 to the passenger side rail 52 (see FIG. 2). As shown in FIGS. 3 and 4, a front edge portion 168 of the headliner 160 may thus be positioned adjacent the windshield 70 and adjacent the front header 54. The vehicle 12 may include a trim piece (not shown) supported on the roof 40 for receiving the front edge portion 168 of the headliner 160.

The windshield curtain 80 may be placed in the stored condition in any suitable manner. In the illustrated embodiments, the windshield curtain 80 is placed in the deflated and stored condition by rolling the curtain in what is referred to herein as an "outboard roll." Referring to FIG. 4, to produce this outboard roll, the windshield curtain 80 is rolled up in a direction outboard of the vehicle 12 toward the windshield 70. Alternative methods, such as folding the windshield curtain 80 in a back-and-forth manner (see FIGS. 6 and 7) or a combination of rolling and folding the curtain, may also be used to place the curtain in the stored condition. When the windshield curtain 80 is in the deflated and stored condition, the curtain is positioned in the housing 84 between the roof 40 and the headliner 160.

The vehicle 12 includes a sensor mechanism 200 (shown schematically in FIG. 2) for sensing an event for which inflation of the windshield curtain 80 is desired, such as a vehicle collision and/or a vehicle rollover. Upon sensing the occurrence of the event for which inflation of the windshield curtain 80 is desired, the sensor mechanism 200 provides an electrical signal over lead wires 202 to the inflator 86. The electrical signal causes the inflator 86 to be actuated in a known manner. The inflator 86 discharges fluid under pressure into the fill tube 88. The fill tube 88 directs the fluid into the windshield curtain 80.

The windshield curtain 80 inflates under the pressure of the inflation fluid from the inflator 86. The windshield curtain 80 inflates and deploys away from the roof 40 and along the windshield 70 in a generally downward and forward direction as indicated generally by the arrow labeled 204 in FIGS. 1 and 5 to the position illustrated at 80' in FIG. 1.

The windshield curtain 80, when inflated, is positioned between the windshield 70 and a vehicle occupant and between the instrument panel 74 and the vehicle occupant. The windshield curtain 80 thus may help protect a vehicle occupant upon the occurrence of an event (e.g., vehicle collision or rollover) for which inflation of the windshield curtain is desired. The windshield curtain 80, while inflated, helps absorb the energy of impacts with the windshield curtain and helps distribute the impact energy over a large area of the curtain.

According to the present invention, mounting the module 82 in the recess 90 places the windshield curtain 70 in an advantageous position relative to the vehicle 12. As shown in FIGS. 4 and 5, the module 82, when mounted in the recess 90, is positioned close to the windshield 70 and the vehicle roof 40. Only the overlying adjacent front edge portion 130 of the front header 54 and the front edge portion 142 of the outer roof panel 42 are positioned between the module 82 and the windshield 70. In this position, the seam 78 is presented facing downward and forward in the vehicle 12 in a direction generally parallel to and along the contour of the windshield 70 (see FIG. 4). Because the windshield curtain 80 deploys from the module 82 through this forward facing seam 78, the front header 54 may not provide any substantial impediment to deployment of the windshield curtain 80. Placement of the module 82 in the recess 90 thus permits positioning of the module for deployment of the windshield curtain 80 in a desired direction without obstruction from the front header 54.

Also, because the module 82 is mounted in the recess 90, the headliner 160 may be configured to extend relatively close to the vehicle roof 40 in a manner similar or identical to a headliner of a vehicle that does not include a windshield curtain module. This may help reduce or eliminate the need to configure the headliner 160 specially to accommodate the module 82. This also may help avoid intrusion of the headliner into the passenger compartment, which may reduce vehicle headroom or impede vision through the windshield 70. In fact, mounting the module 82 in the recess 90 may even allow the headliner 160 to be positioned closer to the roof 40 and thus may help improve vehicle headroom and vision through the windshield 70.

Figure 7:
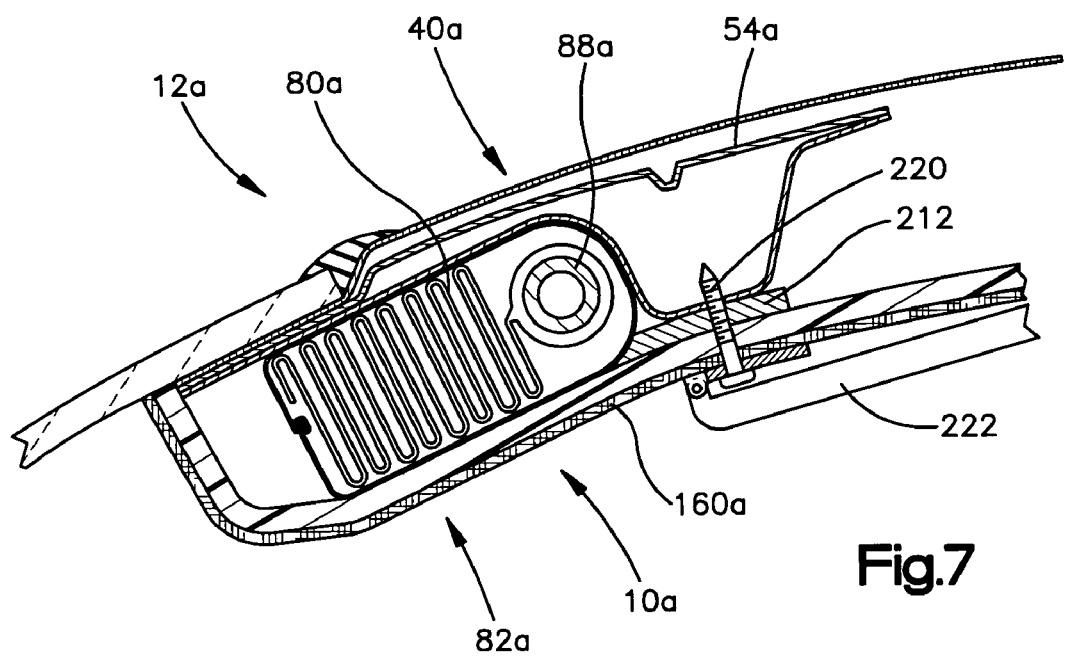

A second embodiment of the present invention is illustrated in FIGS. 6 and 7. The second embodiment of the invention is similar to the first embodiment of the invention illustrated in FIGS. 1–5. Accordingly, numerals similar to those of FIGS. 1–5 will be utilized in FIGS. 6 and 7 to identify similar components, the suffix letter "a" being associated with the numerals of FIGS. 6 and 7 to avoid confusion. The second embodiment of the present invention is similar to the first embodiment (FIGS. 1–5), except that the windshield curtain module of the second embodiment is mounted to the vehicle in a manner different than the module of the first embodiment.

Referring to FIGS. 6 and 7, the apparatus 10a includes a windshield curtain module 82a that is mounted on the headliner 160a of the vehicle 12a. In this configuration, any or all of the components of the module 82a, i.e., the windshield curtain 80a, the housing 84a, the fill tube 88a, and the inflator (not shown) may be mounted on the headliner 160a. In this configuration, the headliner 160a and the module 82a may be assembled and installed in the vehicle 12a as a unit. Thus, for example, the headliner 160a and the module 82a may be assembled at a one site and then installed in the vehicle 12a at another site.

Also, certain components may be added to or omitted from the module 82a. For example, the housing 84a may be omitted from the module 82, in which case the windshield curtain 80a may be connected directly to the headliner 160a or may be connected to the headliner via the fill tube 88a. In this instance, a fabric cover piece (not shown) may be added to the module 82a to at least partially cover the windshield curtain 80a.

The module 82a may be assembled with the headliner 160a in a variety of ways. In the embodiment illustrated in FIG. 6, the module 82a is connected to the headliner 160a by a push-in type fastener 210 sometimes referred to as a "fir tree" or "Christmas tree" fastener. Other types of fasteners, such as clips and threaded fasteners, may also be used to connect the module 82a with the headliner 160a.

As shown in FIG. 6, the push-in fastener 210 extends through the headliner 160a, through a flange 212 of the housing 84a of the module 82a, and through the front header 54a of the roof 40a. The fastener 210 thus may serve to help initially connect the assemblage of the headliner 160a and the module 82a to the vehicle 12a. Once initially connected to the vehicle 12a by the fastener 210, the assemblage of the headliner 160a and the module 82a may be fixedly connected to the vehicle 12a, as described below.

Referring to FIG. 7, once initially connected to the roof 40a by the fastener 210, the assemblage of the headliner 160a and the module 82a may be fixedly connected to the vehicle 12a by suitable means 220, such as a threaded fastener. Since in this configuration the module 82a is installed in the vehicle 12a at the same time as the headliner 160a, the fastener 220 may also connect other items to the vehicle 12a. As shown in FIG. 7, in addition to the headliner 160a and module 82a, the fastener 220 also helps connect a visor 222 to the vehicle 12a. Those skilled in the art will appreciate that the fastener 220 may similarly help connect items such as rear view mirror, grab handles, and trim pieces to the vehicle 12a.

From the above description of the invention, those skilled in the art will perceive improvements, changes and modifications. For example, the structural configuration of the vehicle depicted in the illustrated embodiments is a simplified schematic example of a structural configuration in which the present invention may be implemented. This illustrated vehicle configuration is not meant to limit or otherwise preclude implementation of the present invention in a vehicle in which the structural configuration may differ from the structure depicted herein. For instance, it will be appreciated that the front header of a vehicle may have a configuration different than the front header of the illustrated embodiments. In this instance, according to the present invention, the windshield curtain may nevertheless have a stored condition in which the curtain is positioned in a recess that extends into a forward facing surface of the front header. These and other such improvements, changes and modifications within the skill of the art are intended to be covered by the appended claims.

Having described the invention, the following is claimed:

1. Apparatus for helping to protect an occupant of a vehicle that has a windshield and a roof including a front header, said apparatus comprising:
an inflatable windshield curtain inflatable away from the roof to a position between the windshield and a vehicle occupant, said windshield curtain having a stored condition in which said windshield curtain is positioned in a recess that extends into a forward facing surface of the front header said recess is presented facing toward the windshield.

2. The apparatus recited in claim 1, wherein the windshield overlies a portion of the front header, said windshield curtain when in said stored condition being positioned in said recess underlying said portion of said front header.

3. The apparatus recited in claim 1, wherein the front header has a length extending across a width of the vehicle, said recess extending along a portion of the length of the front header.

4. The apparatus recited in claim 1, wherein said windshield curtain when in said stored condition positioned in said recess has an elongated configuration extending laterally across a width the vehicle.

5. The apparatus recited in claim 1, wherein the vehicle includes a headliner underlying the roof, said windshield curtain when in said stored condition being positioned between the roof and the headliner.

6. The apparatus recited in claim 5, wherein said windshield curtain when in said stored condition is positioned between the front header and the headliner.

7. The apparatus recited in claim 5, wherein said windshield curtain is mounted on the headliner.

8. The apparatus recited in claim 5, wherein said windshield curtain forms part of a module, said module comprising a housing connected with the headliner, said windshield curtain being supported in said housing.

9. The apparatus recited in claim 8, wherein said module further comprises an inflation fluid source for providing inflation fluid for inflating said windshield curtain.

10. The apparatus recited in claim 8, wherein said module further comprises a fill tube for delivering inflation fluid from said inflation fluid source to said windshield curtain.

11. The apparatus recited in claim 1, wherein the front header comprises overlying upper and lower sheets of material connected with each other at selected locations along front and rear longitudinal edges of the front header where said sheets of material are in abutting engagement with each other, portions of said upper and lower sheets between said longitudinal edges being spaced from each other to form a structure reinforcing portion of the front header, said recess being formed in said lower sheet of material.

12. The apparatus recited in claim 1, wherein said windshield curtain is inflatable to a position between an instrument panel of the vehicle and a vehicle occupant.

13. Apparatus for helping to protect an occupant of a vehicle that has a windshield and a roof including a front header, said apparatus comprising:
 a headliner underlying the vehicle roof; and
 a module connected with the headliner and positioned between the headliner and the vehicle roof, said module comprising an inflatable windshield curtain supported on the headliner and being positioned in a recess formed along a forward facing portion of the front header, said recess is presented facing toward the windshield said windshield curtain being inflatable away from the roof to a position between the windshield and a vehicle occupant.

14. The apparatus recited in claim 13, wherein said module further comprises a housing connected with the headliner, said housing being positioned in said recess, said windshield curtain being supported in said housing.

15. The apparatus recited in claim 13, wherein the windshield overlies a portion of the front header, said module being positioned in said recess underlying said portion of said front header.

16. The apparatus recited in claim 13, wherein the front header has a length extending across a width of the vehicle, said recess extending along a portion of the length of the front header.

17. The apparatus recited in claim 13, wherein said module when positioned in said recess has an elongated configuration extending laterally across a width the vehicle.

18. The apparatus recited in claim 13, wherein said module further comprises an inflation fluid source for providing inflation fluid for inflating said windshield curtain.

19. The apparatus recited in claim 13, wherein said module further comprises a fill tube for delivering inflation fluid from said inflation fluid source to said windshield curtain.

20. The apparatus recited in claim 13, wherein the front header comprises overlying upper and lower sheets of material connected with each other at selected locations along front and rear longitudinal edges of the front header where said sheets of material are in abutting engagement with each other, portions of said upper and lower sheets between said longitudinal edges being spaced from each other to form a structure reinforcing portion of the front header, said recess being formed in said lower sheet of material.

21. The apparatus recited in claim 13, wherein said windshield curtain is inflatable to a position between an instrument panel of the vehicle and a vehicle occupant.

* * * * *